United States Patent [19]
von Taschitzki

[11] Patent Number: 5,123,379
[45] Date of Patent: Jun. 23, 1992

[54] DEVICE FOR THE AUTOMATIC FEEDING OF DOMESTIC ANIMALS, IN PARTICULAR PIGS

[75] Inventor: Rainer von Taschitzki, Cologne, Fed. Rep. of Germany

[73] Assignee: Aratowerk Walter von Taschitzki GmbH & Co. KG, Fed. Rep. of Germany

[21] Appl. No.: 690,463

[22] Filed: Apr. 24, 1991

[30] Foreign Application Priority Data

Apr. 24, 1990 [DE] Fed. Rep. of Germany ....... 4013008

[51] Int. Cl.⁵ ............................................. A01K 5/02
[52] U.S. Cl. ............................... 119/53.5; 119/54
[58] Field of Search ............... 119/54, 53.5, 53, 70, 119/75, 51.04, 57.91

[56] References Cited

U.S. PATENT DOCUMENTS

| 920,806 | 5/1909 | Wright | 119/53.4 |
|---|---|---|---|
| 1,118,629 | 11/1914 | Bowers | 119/70 |
| 1,314,624 | 9/1919 | Weber | 119/53.5 |
| 1,498,220 | 6/1924 | Winkler | 119/70 |
| 1,879,247 | 9/1932 | Holliday | 119/54 |
| 4,242,985 | 1/1981 | Freeborn | 119/54 |
| 4,719,875 | 1/1988 | Van Gilst | 119/54 |
| 4,953,504 | 9/1990 | Taylor | 119/54 |

FOREIGN PATENT DOCUMENTS

| 1404363 | 4/1973 | United Kingdom | 119/54 |
|---|---|---|---|
| 2187626 | 9/1987 | United Kingdom | 119/54 |

Primary Examiner—Robert P. Swiatek
Assistant Examiner—Todd E. Manahan
Attorney, Agent, or Firm—Diller, Ramik & Wight

[57] ABSTRACT

The device for the automatic feeding of domestic animals, in particular pigs, with pourable feed has a feed trough in a housing above which there is a cone-shaped feed container with an opening in the floor and a vibrating device which passes through this opening. The front wall of the housing has an opening which fits the head of the animal to be fed, located underneath the hopper wall of the feed container, between the latter and the trough. In addition, there is a vibrating device with a vibrating plate which is larger than the opening in the container floor. The distance between the vibrating plate and the container floor can be adjusted to the relevant grain size of the feed.

9 Claims, 2 Drawing Sheets

DEVICE FOR THE AUTOMATIC FEEDING OF DOMESTIC ANIMALS, IN PARTICULAR PIGS

BACKGROUND OF THE INVENTION

The invention relates to a device for the automatic feeding of domestic animals, in particular pigs, with pourable feed and consists of a feed trough above which there is a partially cone-shaped feed container having a floor with an opening and a vibrating device which passes through the opening by means of which the animals can obtain controlled portions of feed.

The particular problems of such feed devices result from the fact that different feed mixtures, like meal, whole meal, corn groats and others can vary greatly in both grain size and moisture content, so that, on the one hand, their ability to pour and, on the other, their tendency to aggregate in the feed container make it difficult for the device to operate smoothly and for the animals to obtain feed without the device jamming.

An object of the present invention is to create a device for automatic feeding which allows the animals to cause the desired portions of feed they require at any time to consistently pour into the trough without jamming, even where unreliable, poorly pouring feed mixtures are used. The invention is distinguished by the fact that the front wall of the housing has an opening below the hopper wall of the feed container, between the latter and the trough, which fits the shape of the head of the animal to be fed and by the fact that there is a vibrating device with a vibrating plate which is larger than the opening in the container floor, the distance between the vibrating plate and the container floor being adjustable to the relevant grain size of the feed.

The vibrating plate is installed in such a way that at rest it covers the opening in the floor of the feed container so that no feed can slip through into the trough. If the animals activate the vibrating device, however, it results in a millstone-like effect which is made possible by the invention and which transports the feed from the centre of the floor opening to the edge of the vibrating plate, where it gradually falls into the trough.

The ability to adjust the distance between the container floor and the vibrating plate to the grain size of the feed prevents the vibrating plate from being blocked by grains which have gotten stuck and, on the other hand, breaks up feed clumps. The advantage of this is that moister feeds, which tend to form clumps, can also be removed just as easily by the animals.

SUMMARY OF THE INVENTION

The present invention thus provides a device for the automatic feeding of a domestic animal with pourable feed, consisting of a feed trough in a housing above which there is a partially cone-shaped feed container having a floor with an opening, and a vibrating device which passes through the opening and by means of which the animals can obtain controlled portions of feed, characterized by the fact that a front wall of the housing has an opening below the hopper wall of the feed container which fits the shape of the head of the animal to be fed, between the feed container and the trough, and by a vibrating device with a vibrating plate which is larger than the opening in the container floor, the distance between the vibrating plate and the container floor being adjustable to the relevant grain size of the feed.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
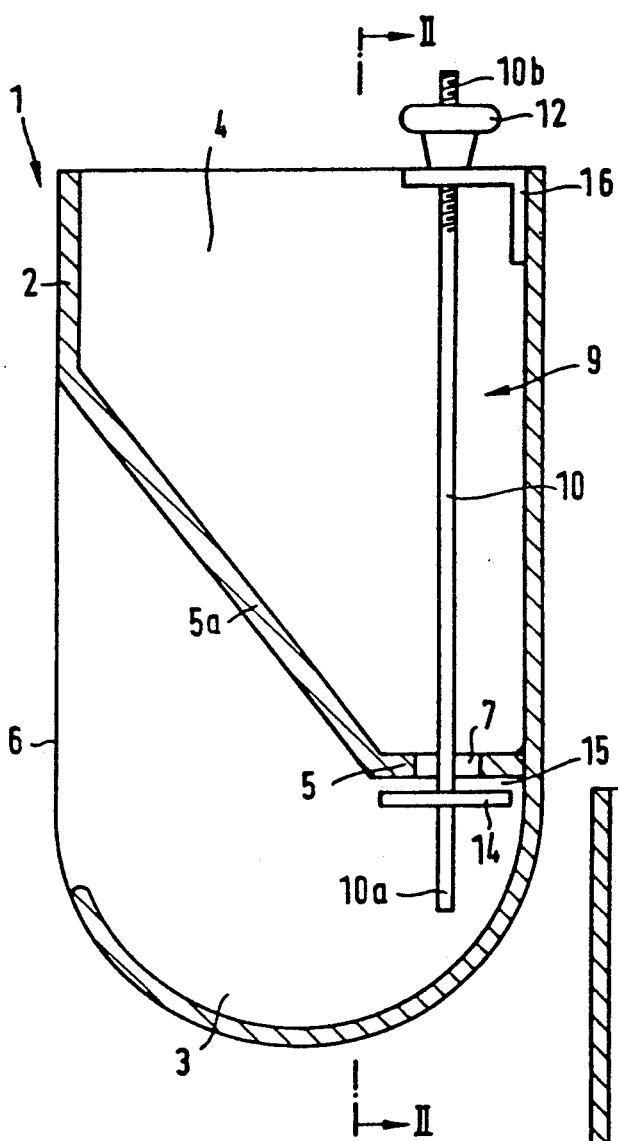
FIG. 1 is a vertical cross-section illustrating a first embodiment of an automatic feeding housing of the invention.

The device 1 for the automatic feeding of domestic animals, for example pigs, comprises a housing 2 including a feed trough 3 and a feed container 4. The feed container 4 is provided with a floor 5 and a hopper wall 5a disposed above an opening 6 for the head of the animal. A vibrating device 9 extends through an opening 7 in the floor 5 of the container 4.

Figure 2:
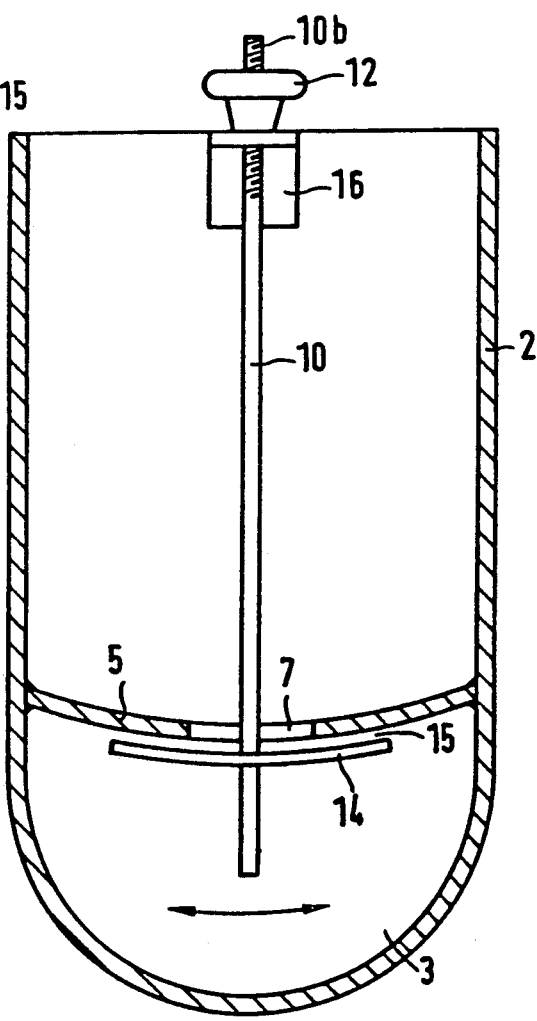
FIG. 2 is a longitudinal section through the housing along line II—II of FIG. 1.
Figure 3:
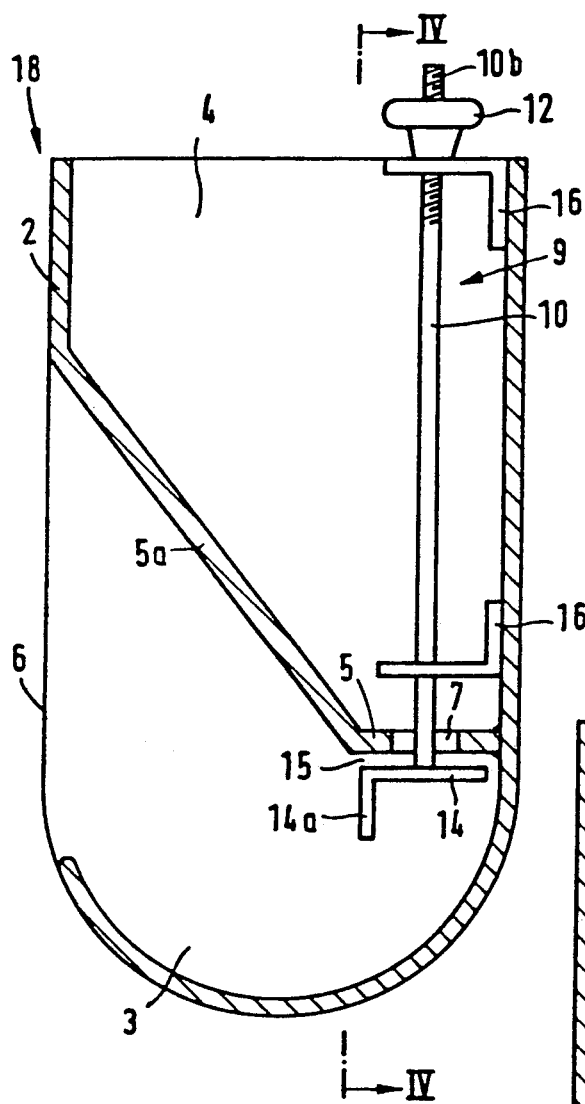
FIG. 3 is a vertical cross-section illustrating a further embodiment of the automatic feeding housing of the invention.
Figure 4:
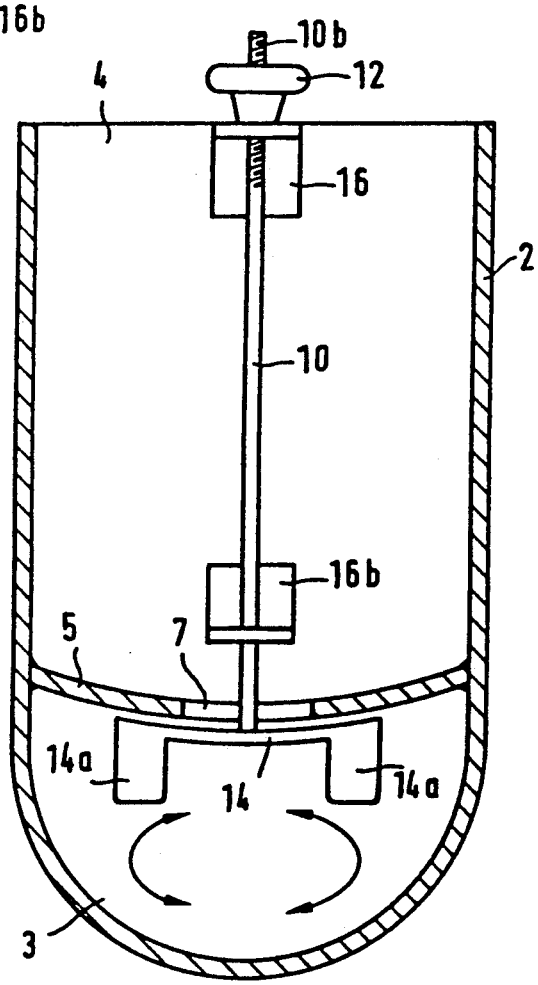
FIG. 4 is a longitudinal section along line IV—IV of FIG. 3.

The vibrating device 9 can be designed in such a way that a vibrating plate 14 is arranged on a swinging vibrating rod 10 whose end 10a extends into the trough 3 and can be moved back and forth by the animals, as illustrated in FIGS. 1 and 2; or the vibrating rod 10, disposed through a holder 16, may be pivoted axially within a second vibrating rod holder 16b, as illustrated in FIGS. 3 and 4. In the latter embodiment the vibrating plate 14 has extensions 14a extending downwards into the trough 3 which can be used by the animals to partially rotate the plate 14

The vibrating plate 14 can preferably be located underneath the container floor 5, but, depending on the type of feed, an arrangement above the opening 7 in the container floor 5 may also be advantageous. In each case, however, the surfaces of the vibrating plate 14 and of the container floor 5 which face one another, are of such a design that they maintain the same distance 15 overall from one another when the plate 14 is moving.

In order to adjust the distance 15 of the vibrating plate 14 from the container floor 5, the upper end 10b of the vibrating rod 10 is equipped with a thread and is mounted in the vibrating rod holder 16 so that its height can be adjusted by means of a screw grip 12.

Although a preferred embodiment of the invention has been specifically illustrated and described herein, it is to be understood that minor variations may be made in the apparatus without departing from the spirit and scope of the invention, as defined the appended claims.

I claim:

1. A device for the automatic feeding of a single domestic animal, comprising a feed trough in a housing, stationary feed container in said housing above said feed trough a partially cone-shaped hopper wall and a bottom wall with an opening formed therein, a vibrating device which passes through the opening and by means of which the animal can obtain controlled portions of feed, a front wall of the housing having an opening below the hopper wall of the feed container which fits the shape of the head of the animal to be fed, said vibrating device carrying a plate at a lower end thereof which is bigger than said opening in said container bottom wall, the distance between said plate and said container bottom wall being adjustable to the grain size of the feed, and a surface of said plate and surface of said container bottom wall which oppose one another are of such a design that the same generally singular distance overall is maintained between the plate and the container bottom wall when the plate is in motion.

2. The automatic feeding device as defined in claim 1 wherein said vibrating devices comprises a swinging vibrating rod having an end extending into the trough which can be moved back and forth by the animal, said plate being mounted on said vibrating rod.

3. The automatic feeding device as defined in claim 2 wherein said vibrating rod is disposed through a first vibrating rod holder and is pivotable axially within a second vibrating rod holder, and said plate has extensions extending downwards into said trough which are adapted to be used by the animal to partially rotate the plate.

4. The automatic feeding device as defined in claim 3 wherein said plate is located below the container bottom wall.

5. The automatic feeding device as defined in claim 3 wherein an upper end of said vibrating rod is equipped with a thread and a screw grip, and said vibrating rod is mounted in a said first vibrating rod holder such that its height can be adjusted.

6. The automatic feeding device as defined in claim 2 wherein said plate is located below the container bottom wall.

7. The automatic feeding device as defined in claim 2 wherein an upper end of said vibrating rod is equipped with a thread and a screw grip, and said vibrating rod is mounted in a vibrating rod holder such that its height can be adjusted.

8. The automatic feeding device as defined in claim 1 wherein said plate is located below the container bottom wall.

9. The automatic feeding device as defined in claim 8 wherein an upper end of said vibrating rod is equipped with a thread and a screw grip, and said vibrating rod is mounted in a vibrating rod holder such that its height can be adjusted.

* * * * *